United States Patent [19]

Kumins

[11] Patent Number: 5,133,959
[45] Date of Patent: Jul. 28, 1992

[54] SYNTHETIC CRUSTACEAN ATTRACTANT COMPOSITIONS

[75] Inventor: Charles Kumins, Easton, Md.

[73] Assignee: David G. Manning

[21] Appl. No.: 702,365

[22] Filed: Jun. 25, 1991

Related U.S. Application Data

[63] Continuation of Ser. No. 368,821, Jun. 20, 1989, abandoned.

[51] Int. Cl.$^5$ ............................................. A01N 25/00
[52] U.S. Cl. ..................................................... 424/84
[58] Field of Search ......................................... 428/84

[56] References Cited

U.S. PATENT DOCUMENTS

| | | | |
|---|---|---|---|
| 3,903,260 | 9/1975 | Beigler et al. | 424/84 |
| 3,903,304 | 8/1975 | Groninger et al. | 426/1 |
| 3,993,746 | 11/1976 | Beigler et al. | 424/78 |
| 4,007,258 | 2/1977 | Cohen et al. | 424/22 |
| 4,490,352 | 12/1984 | Miller | 424/17 |
| 4,564,639 | 1/1986 | Nagase et al. | 514/594 |
| 4,826,691 | 5/1989 | Prochnow | 426/1 |

OTHER PUBLICATIONS

*Chemical Attractants of the Florida Spiny Lobster, Panulirus Argus*, by Barry W. Ache, Bruce R. Johnson Edward Clark of Florida Atlantic Univ., Oct. 1978.

Primary Examiner—Frederick E. Waddell
Assistant Examiner—Russell Travers
Attorney, Agent, or Firm—Sterne, Kessler, Goldstein & Fox

[57] ABSTRACT

Synthetic crustacean attractant compositions useful as bait for crustaceans, especially crabs and lobsters. An attractant is sorbed on a solid carrier. The composition is in either powder form and placed in a permeable package or is formed into a conveniently shaped pellet. The composition is then placed in a trap or attached to a trot line, and the trap or trot line is submerged in an aquatic environment. The attractant which is sorbed on the surface of the solid carrier is in equilibrium with attractant in solution about the composition. The attractant in solution acts to lure the crustaceans. The controlled release process of the invention provides an amount of attractant in solution to lure crustaceans for days. The composition is simple and cost effective to manufacture, has an indefinite shelf life without refrigeration and is very easy to handle.

10 Claims, No Drawings

SYNTHETIC CRUSTACEAN ATTRACTANT COMPOSITIONS

This application is a continuation of application Ser. No. 07/368,821 filed Jun. 20, 1989 now abandoned.

BACKGROUND OF THE INVENTION

1. Field of the Invention

The invention relates to synthetic attractant compositions useful as bait and, more particularly, to synthetic attractant compositions which are useful as bait for marine animals especially crustaceans including crabs, lobsters, as well as fish, turtles and similar marine species.

2. Description of the Related Art

To catch or harvest crustaceans, the present practice involves the use of traps. In the case of crab harvesting, traps, constructed primarily of galvanized chicken wire or similar material, of about 1 to 3 cubic feet in volume are used. Built into the center of the trap is a separate chamber, also of galvanized chicken wire, into which bait is inserted. Lobsters are caught in wooden slatted traps of about 3 to 5 cubic feet in size in which a separate bait chamber is located.

In both instances, the bait may be eels, "trash" fish such as menhaden, chicken necks, clams and similar products depending on their availability (the availability of natural products fluctuates), price and the opinion of the individual waterman on the effectiveness of the available baits. These natural baits are usually purchased in compressed frozen blocks about one cubic foot in volume and, in the case of menhaden, the blocks must be thawed prior to use; a very inconvenient step. Furthermore, menhaden bait is unpleasant and sometimes painful to handle and insert into the traps, because of the sharp fins.

The natural baits noted above all have the disadvantage of decaying rapidly. Thus, these natural baits have to be replenished as frequently as every one or two days. Commercial "crabbers" and lobster men use as many or more than 400 traps each which must be emptied and the bait replaced every one or two days.

Crabs are also caught by means of a trot line. In this method a long line, which may be up to a mile in length, is anchored at each end in the water. At about every six to eight feet along its length, a 6 to 8 foot piece of twine (string) called a "snude" line is tied so that it dangles in the water when the bait is tied to it. The waterman maneuvers his boat back and forth along the trot line which is draped over and rides on a wooden roller arm mounted on the waterman's boat. In this manner each baited string is raised from the water as the waterman works along the trot line. If a crab has attached it's claws to it to eat the bait, the waterman quickly nets the crab before the crab can slip back into the water and freedom. The use of natural bait such as eels, chicken parts, razor clams, etc. are similarly affected by availability and handling disadvantages noted above.

The deficiencies and difficulties in using natural bait as noted above has led to experimentation in using chemical attractants to lure crustaceans such as lobsters. In a paper entitled *Chemical Attractants of the Florida Spiny Lobster, Panulirus Argus*, Technical Paper No. 10, October 1978, Barry W. Ache, Bruce R. Johnson and Edward Clark, all of Florida Atlantic University, it was reported that the chemical stimuli controlling feeding include simple organic compounds such as amino acids and their derivatives. They also recognized that such compounds, once evaluated for effectiveness and appropriately packaged, could provide an effective, economical and convenient artificial bait for marine organisms. The paper describes the results of experiments with synthetic attractants.

Many compounds having some attractant properties for lobsters are listed in that paper. These compounds were evaluated as standard sea water solutions aliquoted into tanks containing lobsters. Obviously, this technique is not practical for commercial application in a natural environment (open water) because the attractant solutions will rapidly diffuse away from the "catching" site since there is nothing to prevent rapid diffusion.

Controlled release attractants are required for practical application of synthetic attractants as bait in a natural environment where crustaceans are found. Releasants reported in the literature include gelatin, polyacrylamide, agar gel, as well as attractants laminated between two barrier layers such as polyvinyl chloride or unbleached muslin. However, these releasants exhibit serious deficiencies. Gelatins dissolve rapidly in sea water, polyacrylamide exhibits gelling difficulties when combined with attractant solutions and the agar gels have weak mechanical properties which preclude the rough handling present in commercial operations.

Difficulties also arise in using barrier layer laminations of attractants. Where the attractant is water soluble, diffusion through a protective barrier layer such as polyvinyl chloride can not readily take place and, if muslin is used in the construction as noted above, the attractant would simply rapidly dissolve away and disappear through the textile fabric. If the attractant is organic soluble, the polymer barrier layer may become plasticized and lose its mechanical integrity as well as its ability to control the diffusion of the attractant.

Accordingly, it may be appreciated that the prior art synthetic attractants and releasants are deficient in meeting optimum or even acceptable levels of performance as bait in a natural environment. The present invention has overcome the deficiencies noted above and provides a synthetic attractant composition exhibiting excellent properties for use as bait for crustaceans.

OBJECTS OF THE INVENTION

It is an object of the invention to provide an artificial bait for crustaceans.

It is another object of the invention to provide a synthetic crustacean attractant.

It is another object of the invention to provide a synthetic crustacean attractant which is released over time.

It is another object of the invention to provide a synthetic crustacean attractant which is economical and simple to manufacture.

It is another object of the invention to provide a synthetic crustacean attractant which is easy to handle.

It is another object of the invention to provide a synthetic crustacean attractant having a selected shape.

It is another object of the invention to provide a synthetic crustacean attractant that has a long shelf life.

It is another object of the invention to provide a synthetic crustacean attractant which performs better than natural bait in attracting crustaceans.

It is another object of the invention to provide a synthetic crustacean attractant which lasts longer than natural bait in a natural environment.

In accordance with the present invention, a controlled release crustacean attractant composition comprises at least one attractant sorbed on a carrier or sorbant. The volume ratio of sorbant to attractant is in a range between 0.2 to 100:25 to 100, respectively. The sorbants are selected from one or more of the group consisting of diatomaceous earth, wollastonite, kaolin, aluminum oxide, zeolite, anhydrite, calcium carbonate, silica gel, silica powder and comminuted paper. The attractants are selected from one or more of the group consisting of butyric acid, caprylic acid, caproic acid, histamine, lysine, citric acid, glycine, alanine and betaine. Other attractants useful in the practice of the invention include other amino acids such as valine, leucine, isoleucine, proline, phenylalanine, tryptophan, methionine, serine, threonine, cysteine, tyrosine, asparagine, glutamine, aspartic acid, glutamic acid and arginine and their derivatives.

A composition according to the present invention retains its attractant properties over several days and in some cases as long as fourteen days when submerged in water whether sweet, saline or salt water.

The composition may be contained in a permeable packet which is generally constructed of paper or a synthetic or natural textile. Alternately, the composition may be compressed into a selected shape such as a pellet. A binder such as sodium lignin sulfate or sodium resinate may be added to improve the binding characteristics when compressing the composition into a pellet.

DETAILED DESCRIPTION

The invention relates to synthetic crustacean attractant compositions useful as bait for crustaceans, especially crabs and lobsters. The compositions comprise an attractant sorbed on a solid carrier. The composition may be in either powder form and placed in a permeable package or formed into a conveniently shaped pellet. The composition may then be placed in a trap or attached to a trot line, followed by submersion of the trap or trot line in an aquatic environment. The attractant, which sorbed on the surface of the solid carrier, is in equilibrium with attractant in solution about the composition. While in solution, the attractant functions to lure the crustaceans. The controlled release process of the invention provides a relatively constant release of attractant over time into the aquatic environment to lure crustaceans. The composition is simple and cost effective to manufacture, has an indefinite shelf life without refrigeration, and is very easy to handle.

One of ordinary skill in the art can determine effective attractant/sorbant compositions which are useful as attractants in a natural environment without undue experimentation. For example, a particular attractant as described above may be sorbed on a particular sorbant, placed in an aquatic environment, and the level of attractant measured over several days or weeks. Preferably, the water will be changed frequently to allow measurement of the continuing release of attractant. Methods for detecting and quantitating attractants such as those described above are well known to those of ordinary skill in the art. Preferred attractants will have an equilibrium release constant, expressed as $$\frac{[\text{attractant in water}]}{[\text{attractant in water}] + [\text{attractant in sorbant}]}$$

of substantially less than 1. Preferably, the equilibrium release constant is between 0.1 to 0.00001.

Although Applicant does not wish to be bound by any particular theory, preferred sorbants may be absorbed and held strongly to the sorbant by ionic interactions, particularly where the attractant and sorbant have ionic or hydrogen bonding characteristics. Knowledge, therefore, of the surface characteristics of the sorbents and the molecular structure of the sorbates (the attractants) may be used to, a priori, select an appropriate combination of attractant and carrier for an efficient marine animal lure. Regardless of the operative theories, it has been found that certain powders, as described herein, function as efficient carriers of attractants. Examples of adsorbents that may be used include diatomaceous earth, wollastonite, kaolin and other clays, aluminum oxide, zeolite, natural or synthetic calcium carbonate, silica gel, silica powder, anhydrite and comminuted paper. These adsorbents all have large surface areas, are insoluble in water and do not strongly retain the attractants. Of course, those skilled in the art may select other materials may be useful as absorbents without undue experimentation.

The attractants described in the previously noted paper, *Chemical Attractants of the Florida Spiny Lobster, Panulirus Argus*, when combined with the proper sorbents function not only to attract lobsters, but also crabs, fish and even turtles. Many of the reported attractants for crustaceans have varying degrees of water solubility. The attractants are generally simple organic compounds. Examples of such compounds are butyric acid, caprylic acid, caproic acid histamine, lysine, citric acid, glycine, alanine and betaine. Amino acids and their derivatives have generally been found to be useful as attractants. Those of skill in the art may select other such organic compounds to be employed as attractants without undue experimentation. These attractants act as chemical stimuli for the feeding response in crustaceans.

According to the invention, the compositions of the invention comprise a powdered adsorbent having a mean particle size varying from 0.2 microns to 100 microns to which is added and mixed 0.2%–25% by volume of a solution (preferably aqueous) of a selected attractant. The amount of attractant is based on its attracting efficiency coupled with economic considerations and importantly, on critical volume. Critical volume is the volume that can be accommodated by the surface area of the absorbent while still retaining its powdery characteristics. The mixing process is simply designed to distribute the attractant uniformly through the powdered adsorbent.

In a preferred embodiment of the invention, the resulting powdery mixture is then packaged, manually or by machine, in a water resistant but porous or permeable wrapper to form a packet. The wet strength paper used in the examples may be substituted for a polymer base textile such as nylon, urethane or other similar polymeric material. Of course, those of skill in the art will recognize that natural textiles may be used. However, it is important that the packaging not interfere with the release of the attractant into the aquatic environment. Biodegradability of any packaging used to contain powdered variations of the synthetic crustacean attractant composition is also important for ecological and convenience concerns. The size of the packet is not critical, and depends merely on the type of application and the quantity of composition.

In another preferred embodiment according to the invention, the composition may be formed into pellets having a selected shape. In applications where pellets can be used, pellets have the advantage of eliminating the wrappers and the concomitant problems associated with packaging and biodegradability of the wrapper. When used in this fashion, adding 1% of a compacting agent (binder) such as sodium lignin sulfate or a rosin compound insures good pelletizing to prevent disintegration when immersed in water. The pellet embodiment is especially advantageous for use on a trot line as the pellet may be formed into a convenient shape such as a "dog bone" for attachment to the snude lines dangling from the main line as described herein.

EXAMPLES

The following examples refer to quantities by weight for convenience in compounding. All testing described in the examples was done in a natural environment.

EXAMPLE I 15 grams of diatomaceous earth are tumbled together with 1.5 grams of butyric acid in a small jar mill for 10 minutes to insure good mixing and adsorption of the acid. The resulting dry powder is wrapped in a wet strength cellulose paper approximating a tea bag in shape the ends of which are tied together so as to retain the powder. This packet is then placed in the bait compartment of a crab trap. In testing, a crab trap containing the packet was immersed in water where crabs are known to be found. On raising the trap one hour later it was found to contain 3 mature crabs.

EXAMPLE II 300 grams of diatomaceous earth are mixed in a rotating mill with 45 grams of butyric acid for 25 minutes. As in Example I, the powder is wrapped and tied in approximately 20 gram portions in the water proof paper. In testing, 20 individual crab traps each had a packet placed in the bait compartment and the traps were immersed in a crab infested body of water. After eight hours the traps were removed and each trap was found to contain three to eight crabs.

EXAMPLE III 100 grams of wollastonite, a natural calcium silicate, is tumbled with 3 grams of butyric acid in a rotating jar mill for one half hour, The resulting powder is divided into 15 gram portions, wrapped and tied as described in the previous examples in a wet strength paper. In testing, the packets were placed in separate crab traps and dropped into the water where crabs were known to be present. After four hours the pots were removed and found to contain two to five crabs. As a control, packets containing wollastonite without butyric acid were also placed in crab traps. The traps containing woolastonite contained no crabs.

EXAMPLE IV

The same general procedure is followed as described in the previous examples except that 200 grams of kaolin are mixed with six grams of caprylic acid. In testing, this composition attracted three to nine crabs in each of the traps after six hours submersion, depending upon the location of the trap.

EXAMPLE V

The same general procedure is followed as described in the previous examples except that 200 grams of kaolin are mixed with six grams of caproic acid. In testing this composition was found to be effective in attracting crabs.

EXAMPLE VI

As previously described, 1,000 grams of comminuted paper powder are mixed with 10 grams of histamine for five hours. During testing, packets prepared from this mixture and placed into traps attracted crabs into the traps.

EXAMPLE VII

The same mixing procedure as described previously, but using mixtures of 20 grams silica powder and 1 gram lysine are employed. Crabs were attracted to this composition within the traps. Silica powder by itself was not active in attracting crabs when tested as a control.

EXAMPLE VIII 500 grams calcium carbonate are mixed in a ball mill with 40 grams citric acid. The mill should be vented to allow release of the resulting $CO_2$. The powder now containing the water soluble calcium citrate is packaged as described in the previous examples in 15 gram portions and tested as an attractant for crabs and lobsters in the manner described in the previous examples. Crab traps containing this mixture contained crabs whereas the calcium carbonate tested as a control was not active in enticing crabs into the traps.

EXAMPLE IX

Using the same procedures described in Examples I to VI, 1,000 grams of synthetic zeolite made by reaction of sodium aluminate and sodium silicate are mixed with 120 grams of glycine in a conical tumbler for one hour. The resulting powder is packaged in 25 gram portions in a wrapper treated with a heat sensitive adhesive which permits it to be sealed by heating the folded edge to be joined together. This composition was active in enticing crabs and lobsters into the traps when tested.

EXAMPLE X

A mixture of 150 grams of silica gel and 15 grams caprylic acid are prepared by tumbling together for one hour in a jar mill. The resulting powder, in 50 gram packets, attracted both crabs and lobsters in traps which had been submerged for six hours.

EXAMPLE XI 90 grams of alanine previously dissolved in two liters of water are added with stirring to 1,000 grams of diatomaceous earth. Fifty grams of this moist powder was packaged in water resistant treated paper, inserted into traps and immersed in a body of water known to contain crabs. In testing, crabs were harvested daily for five days without replacing the packets.

EXAMPLE XII 10 grams of histamine is dissolved in 20 ml $H_2O$ which is mixed with 125 grams of anhydrite. The resulting powder was packaged in wet strength paper in 15 gram aliquots. In testing, packets were placed in traps—one packet for each crab trap and three or more packets for each of the larger lobster traps. After immersion in appropriate bodies of water, the traps were harvested daily for five day periods. At the end of each day, crabs and lobsters were found in the traps.

EXAMPLE XIII 2 grams of betaine are dissolved in 10 ml water and then mixed with 13.3 grams of aluminum oxide. The resulting wet powder is packaged as described in Example XI. In testing, crabs were harvested daily over a five day period from traps containing packets made according to this example.

EXAMPLE XIV 10 grams of butyric acid plus 2 grams of alanine are mixed in a tumbler with 100 grams of diatomaceous earth for one hour. The resulting powder is packaged in 15 gram portions in a wet strength paper bag and loaded into crab and lobster traps. After water immersion for five days for testing, lobsters and crabs were harvested from the traps in acceptable quantities.

EXAMPLE XV

The powder of Example I was compressed in a hydraulic press at 200 lbs. per square inch into a disc ¼" in thickness by 2" in diameter. The thickness dimensions and Compression conditions being determined by considerations for easy diffusion of the attractant into the water and the mechanical strength of the disc. To test this embodiment, the disc was placed in a lobster trap which was submerged in water for one day. Two lobsters were found in the trap.

EXAMPLE XVI

The powder of Example XIV is compressed into a "dog bone" shape suitable for attachment by tying to a snude line of a trot line. To test this embodiment, several "dog bone" compressed compositions were attached by tying to a snude line and natural bait was attached to the adjacent snude line. Crabs were found to attach themselves to the "dog bone" compressed composition as well as to the natural bait attached to the adjacent snude line.

SUMMARY

In testing, it was found that using diatomaceous earth as the carrier or sorbant and butyric acid as the attractant was the most favorable composition. Forming the selected composition into pellets of some selected shape has many advantages over packaging the selected composition in a packet.

While the composition of a synthetic crustacean attractant has been described herein and examples provided, numerous modifications and variations of the present invention are possible as will be recognized by those skilled in the art.

I claim:

1. A controlled release crustacean attractant composition consisting essentially of at least one attractant sorbed on an insoluble carrier selected from the group consisting of diatomaceous earth, and comminuted paper wherein said attractant is selected from the group consisting of butyric acid, caprylic acid and caproic acid.

2. A controlled release crustacean attractant composition according to claim 1, wherein said composition retains its attractant properties for approximately fourteen days when submerged in water.

3. A controlled release crustacean attractant composition according to claim 2, wherein said composition retains its attractant properties for approximately fourteen days when submerged in fresh and salt water.

4. A controlled release crustacean attractant composition according to claim 1, wherein the volume ratio of sorbant to attractant is in a range between 0.5 to 100 and 25 to 100, respectively.

5. A controlled release crustacean attractant composition according to claim 1, wherein the volume ratio of sorbant to attractant is in a range between 0.2 to 100 and 25 to 100, respectively.

6. A controlled release crustacean attractant composition according to claim 1 further comprising a binder.

7. A controlled release crustacean attractant composition according to claim 6, wherein said binder is sodium lignin sulfate.

8. A controlled release crustacean attractant composition according to claim 7, wherein said binder is 0.1% to 3% sodium lignin sulfate.

9. A controlled release crustacean attractant composition according to claim 6, wherein said binder is sodium resinate.

10. A controlled release crustacean attractant composition according to claim 9, wherein said binder is 0.1% to 3% sodium resinate.

* * * * *